20
United States Patent Office 3,150,896
Patented Sept. 29, 1964

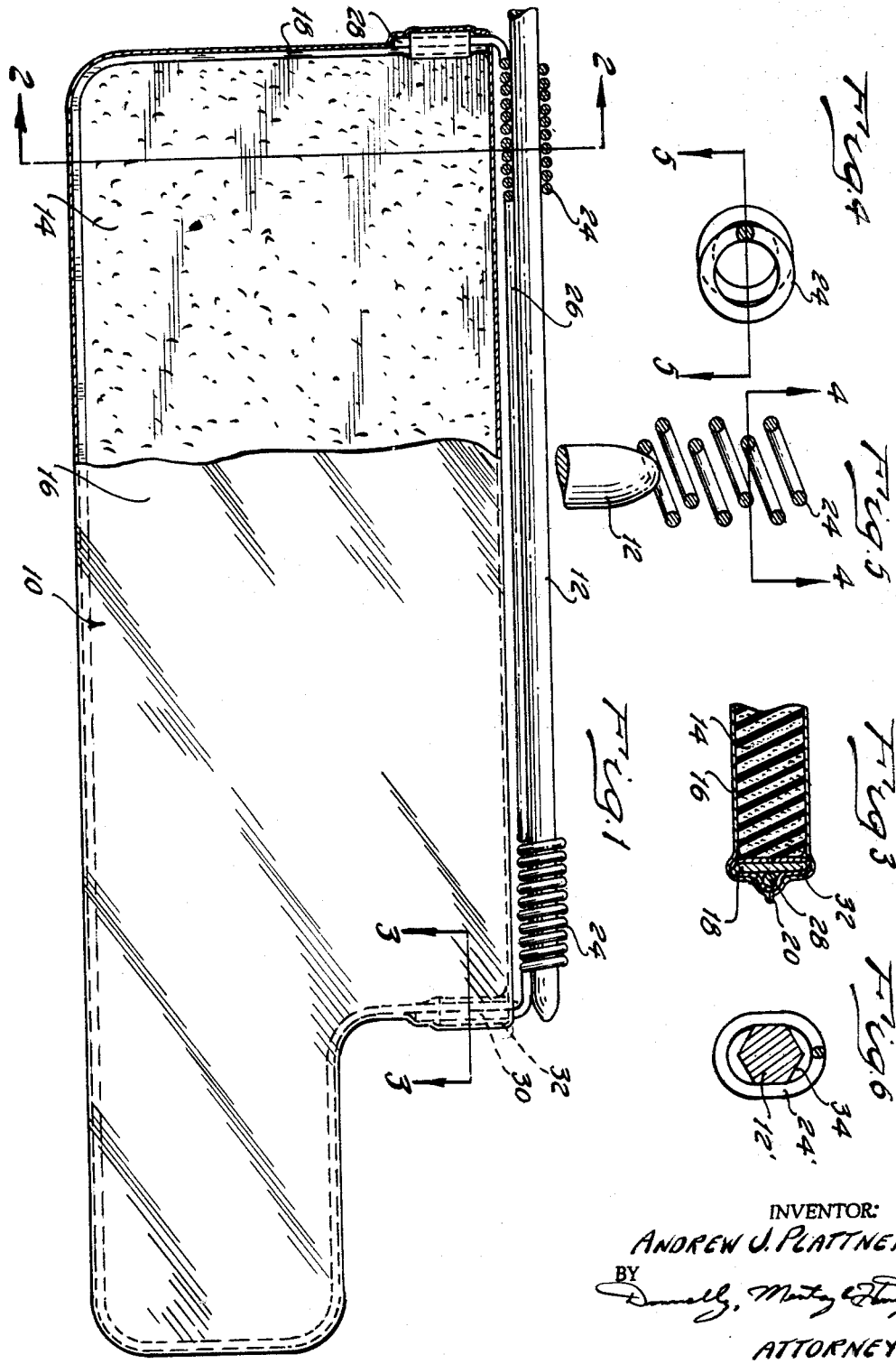

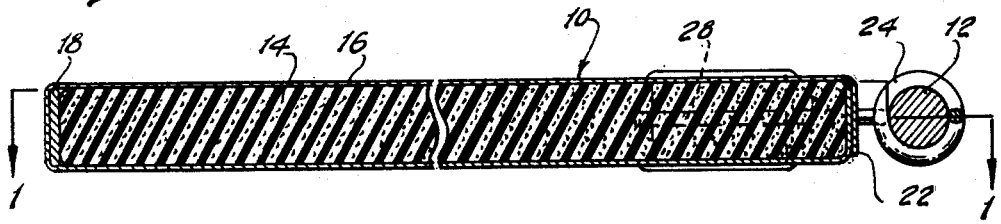
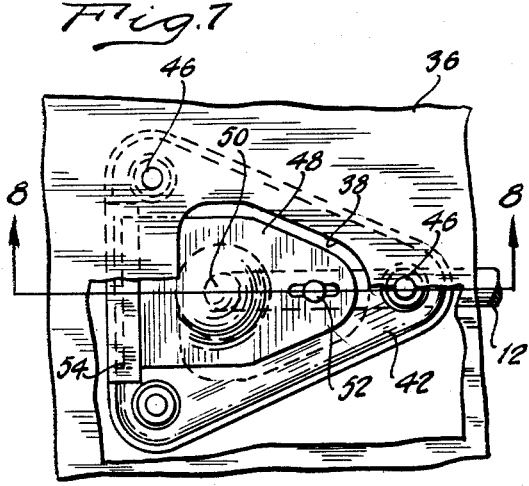
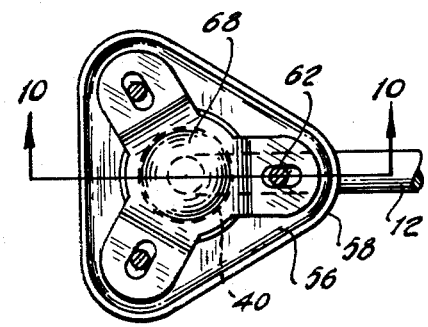
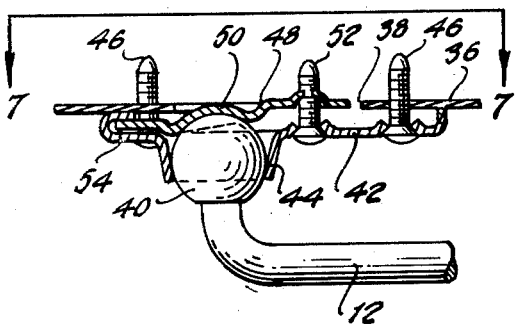
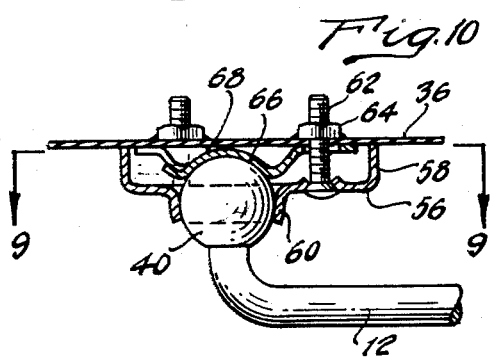

3,150,896
PIVOTALLY MOUNTED VEHICLE SUN VISOR
Andrew J. Plattner, 16593 Cruse, Detroit 35, Mich.
Filed Mar. 26, 1962, Ser. No. 182,476
2 Claims. (Cl. 296—97)

My invention relates generally to adjustable sun shields, and more particularly, to sun visors for use with automotive vehicles.

It is common practice to employ a sun visor in the passenger compartment of automotive vehicles. They are located on the inside of the windshield and may be adjusted by the vehicle operator or the front seat passenger to a position that will allow it to block the glare of the sunlight that passes through the windshield. These visors normally are in the form of a board and are mounted at one margin thereof for rotation about a supporting rod or shaft. A friction grip or connection is provided between the board and the shaft to permit angular adjustment of the visor about the axis of the shaft.

One end of the shaft can be mounted for rotation within a suitable bracket secured to the vehicle body structure. In prior art constructions, it is usual practice to mount such visors for rotation in a single plane of rotation so that it is impossible to vary the height of the visor. If the axis upon which the end of the shaft is mounted is out of alignment, the rod may move to a position that will cause interference between the visor and the overhead body structure. In the alternative, the visor may assume a position that will make it ineffective as a sunshield.

In my improved construction, I have provided means for accomplishing a universal adjustment of the shaft about the end that is connected to the body structure. This will permit the operator to move the visor to any desired position without limitation. Provision is made also for maintaining the visor in any adjusted position once it has been positioned by the operator.

The structure that forms the universal connection is of simplified design and may be adapted readily to vehicles of known construction with little or no alteration in the vehicle body structure. In prior art constructions that include a semi-fixed connection with the overhead vehicle body structure, it is necessary to maintain rather close tolerances in the body bracket structure and in the associated body sheet metal stampings in order to maintain the proper position of the plane in which the visor shaft rotates. The necessity for maintaining close tolerances is eliminated by employing the universal connection of my invention.

The provision of such a universal connection being an object of my invention, it is another object of my invention to provide an improved and simplified friction connection between the visor and its associated shaft so that it will be impossible for the visor to become loose by reason of repeated adjustments during usage.

My improved sun visor is characterized also by a cushioned and yieldable body. The use of an inflexible board as in prior art constructions has been eliminated entirely. Such a hardboard construction is a safety hazard in modern vehicles since the front seat passenger may strike the visor if the vehicle should decelerate sharply, such as during an accident.

The margin of the body of my improved visor is yieldable, although it is characterized by sufficient stiffness to maintain the body portion in its desired form during normal operation. The body itself can be formed of polyurethane foam or some other similar material. The provision of a visor having such a cushioned body is another object of my invention.

For the purpose of more particularly describing my improved visor construction, reference will be made to the accompanying drawings wherein, FIG. 1 is a plan view of a visor embodying the principles of my invention, FIG. 2 is a cross sectional view taken along section line 2—2 of FIG. 1, FIG. 3 is a partial cross sectional view taken along section line 3—3 of FIG. 1, FIG. 4 is a cross sectional view of a friction connection between the visor body portion and the associated mounting shaft and is taken along section line 4—4 of FIG. 5, FIG. 5 is a view of a portion of a friction connection in a disassembled condition, FIG. 6 is a cross sectional view similar to FIG. 4 showing a modified visor mounting shaft, FIG. 7 is a plan view of the universal connection between the shaft and the forward end vehicle body structure, FIG. 8 is a cross sectional view taken along section line 8—8 of FIG. 7, FIG. 9 is a view of a modified form of my invention taken along section line 9—9 of FIG. 10, FIG. 10 is a cross sectional view of the universal connection taken along section line 10—10 of FIG. 9.

Referring first to FIGS. 1 and 2, numeral 10 designates generally the body portion of the sun visor and numeral 12 designates the shaft upon which the body portion 10 is mounted. Body portion 10 may include a polyurethane foam base or core 14 and a vinyl covering 16. Any of the well known synthetic materials can be used for the covering 16.

The body portion 14 is substantially rectangular in form as in conventional constructions. The margin of the body portion 14 has disposed thereabout a flexible metal strip 18. This may be formed of spring steel or any other material that will impart elasticity to the assembly. The covering 16 can envelope the spring steel strip 18 as indicated in FIGS. 2 and 3.

The thickness of the body portion 14 can be varied as desired. I have found, however, that the thickness normally used for conventional visor constructions can be employed with success.

The upper margin of the body portion 10 indicated in FIG. 1 is characterized by an over-lapping of the covering 16 as viewed in FIG. 2. If desired, the margins of the upper and lower layers of the covering 16 at each of the sides of the body portion 10 can be secured together in a seam as indicated at 20 in FIG. 3. The over-lapping arrangement of the upper margin is identified in FIG. 2 by numeral 22.

Referring next to FIGS. 3 and 4, I have illustrated a spring 24 having coils that are off-set alternately, as indicated, in a transverse direction. When the adjacent coils are off-set in this fashion, the effective area of the space defined by the coils becomes reduced. If the shaft 12 then is inserted through the coils shown in FIG. 5, the adjacent coils will move to an aligned condition as indicated in FIG. 1. The coils will exert, however, a gripping force upon the shaft 12, and relative rotation of the shaft 12 within the coils will be resisted.

As indicated in FIG. 1, the spring 24 is shown in two parts, one part being located at the left hand side of the body portion 10 and the other part being located at the right hand side thereof. The intermediate portion of the spring 24 is shown at 26. It is not formed with coils and may extend parallel to the shaft 12 to connect the left hand part with the right hand part.

One end 28 of the spring 24 is deformed so that it will overlie the left hand margin of the body portion as viewed in FIG. 1. In similar fashion, the right hand end 30 of the spring 24 overlies the right hand margin of the body portion 10. As indicated in FIG. 3, the end 28 can be secured to one end of the metallic strip 18 by means of a suitable clip 32. This clip 32 overlies the end 28 and the end of the metallic strip 18 and is deformed as indicated to form a swaged fitting. This connects the spring 24 securely to the metallic strip 18.

In FIG. 6, I show an alternate form for the visor shaft. This shaft of FIG. 6 is formed with a hexagonal cross section with flats 34. Also, the spring may be of oval cross section rather than circular cross section so that the sides of the oval will engage the flats 34.

The spring of FIG. 6 is identified by reference character 24' and its associated shaft is identified by reference character 12'. If the construction of FIG. 6 is used, the body portion 10 can be adjusted to any of three positions corresponding to the position of the flats 34. The shaft 12' thus forms a detent and establishes three operating positions for the visor. It prevents movement of the visor from one position to another unless it is adjusted by the operator.

Referring next to FIGS. 7 and 8, I have shown a universal connection with the shaft 12 and the overhead vehicle body structure 36. The body structure 36 is in the form of sheet metal and may be formed with an opening 38. A ball 40 is formed on the end of the shaft 12. This end can be formed at a right angle with respect to the extended portion of the shaft 12.

The ball 40 is adapted to be received within a circular opening formed in a clamping element 42. This opening is formed with a circular margin that is tapered as indicated at 44. The opening within the tapered margin is of smaller diameter than the maximum diameter of the ball 40. This ball 40 engages the tapered sides 44 and defines therewith a so-called ball and socket joint. The member 42 is connected to the sheet metal body portion 36 by screws 46. These may be of the self tapping type.

A clamping member 48 is disposed over the opening 38 and includes a spherical recess 50 that engages the ball 40. The member 48 can be connected to the member 42 by a threaded screw 52. The member 42 is provided with a counter-sunk margin to accommodate the screw 52. The opening in the member 48 that receives the screw can be formed with threads in a conventional fashion.

The left hand margin of the member 42 as viewed in FIG. 8 overlaps the left hand margin of the member 48 as indicated at 54.

The pressure of the member 48 on the ball 40 can be varied as desired simply by adjusting appropriately the screw 52. A firm connection can be obtained by tightening the screw 52 or a relatively loose universal connection can be provided by loosening the same. This screw 52 is accessible conveniently to the vehicle passengers and can be adjusted by using a simple screw driver or a coin.

Referring next to FIGS. 9 and 10, I have shown a modified construction for the universal connection described previously. This construction does not require an opening in the body sheet metal 36. A clamping member is shown at 56 and is formed with a depending marginal portion 58 that may engage the sheet metal 36 on the inside of the vehicle passenger compartment. Like the member 42 of the embodiment of FIGS. 7 and 8, the member 56 is formed with an opening having a tapered margin 60. The size of the opening is of smaller diameter than the diameter of the wall 40 on the end of the shaft 12. Threaded screws 62 are employed for securing the member 56 to the sheet metal 36. Cooperating nuts 64 can be welded as shown or otherwise secured to the opposite side of the sheet metal 36 to receive the screws 62.

Located within the cavity defined by member 56 is a clamping member 66 having a spherical recess 68 that engages the ball 40. Extended portions of the member 66 are formed with elongated openings for receiving the screws 62. When the screws 62 are tightened from the inside of the vehicle compartment, clamping pressure upon the ball 40 is increased. This provides a frictional universal connection between the shaft 12 and the vehicle body structure. The extended portions of member 66 yield under this pressure and the elongated openings for screws 62 will accommodate this yielding action.

In each of the embodiments of FIGS. 7 through 10, relatively simple and inexpensive sheet metal stampings are employed. No close tolerance fits are required and a minimum amount of time and effort is required during assembly. Such a connection can be formed either during manufacture of the vehicle or after final assembly.

What I claim and desire to secure by U.S. Letters Patent is:

1. A sun visor for an automotive vehicle comprising a flat body portion, a mounting shaft extending along one edge of said body portion, said body portion comprising a homogeneous core of yieldable cushion material and a pliable covering, a flexible stiffening member in the form of a strip secured to the margin of said body portion, a coil spring having coils of non-circular cross-section received over said shaft, one end of said coil spring being secured to the margin of said body portion at one transverse edge thereof and the other end of said spring being secured to the margin of said body portion at the opposite transverse edge thereof, the individual coils of said spring being alternately offset in their normal disassembled condition whereby said coils are stressed after assembly and said shaft is frictionally gripped by said spring to form an adjustable connection between said shaft and said body portion, said shaft having a plurality of flat sides when viewed in transverse cross section, said shaft and said spring thereby providing a detent to define two or more predetermined operating positions for said visor.

2. A sun visor for an automotive vehicle comprising a flat body portion, said body portion comprising a homogeneous core of yieldable cushion material and a pliable covering, a flexible stiffening member in the form of a strip secured to the margin of said body portion, a mounting shaft extending along one edge of said body portion, a coil spring received over said shaft, one end of said coil spring being secured to the margin of said body portion at one transverse edge thereof and the other end of said spring being secured to the margin of said body portion at the opposite transverse edge thereof, the individual coils of said spring being of non-circular cross-section alternately offset in their normal disassembled condition whereby said coils are stressed after assembly and said shaft is frictionally gripped by said spring to form an adjustable connection between said shaft and said body portion, said shaft having a plurality of flat sides when viewed in transverse cross-section, said shaft and said spring thereby providing a detent to define two or more predetermined operating positions for said visor, and means for connecting one end of said shaft to a relatively fixed vehicle body structure.

References Cited in the file of this patent

UNITED STATES PATENTS

| | | |
|---|---|---|
| 2,137,461 | Rhein | Nov. 22, 1938 |
| 2,201,348 | Roberts | May 21, 1940 |
| 2,260,482 | Roberts | Oct. 28, 1941 |
| 2,328,360 | Rigoulot | Aug. 31, 1943 |
| 2,622,922 | Schroeder | Dec. 23, 1952 |
| 2,703,254 | Shockey | Mar. 1, 1955 |
| 2,744,783 | Peavey | May 8, 1956 |
| 2,784,028 | Swider et al. | Mar. 5, 1957 |
| 2,844,406 | Herr | July 22, 1958 |
| 3,032,371 | Berridge et al. | May 1, 1962 |

FOREIGN PATENTS

| | | |
|---|---|---|
| 854,938 | Great Britain | Nov. 23, 1960 |